United States Patent [19]

Kamei et al.

[11] Patent Number: 4,840,245

[45] Date of Patent: Jun. 20, 1989

[54] APPARATUS FOR CONTROLLING VEHICLE SPEED

[75] Inventors: Eiichi Kamei, Nagoya; Hideaki Namba, Oobu, both of Japan

[73] Assignee: Nippondenso Co., Ltd., Kariya, Japan

[21] Appl. No.: 183,378

[22] Filed: Apr. 13, 1988

Related U.S. Application Data

[63] Continuation of Ser. No. 830,139, Feb. 18, 1989, abandoned.

[30] Foreign Application Priority Data

Feb. 18, 1985 [JP]  Japan ................................. 60-31906

[51] Int. Cl.⁴ ............................................. B60K 31/04
[52] U.S. Cl. ..................................... 180/179; 74/857;
123/352; 364/148; 364/174; 364/431.05
[58] Field of Search ....................... 180/177, 178, 179;
123/352, 436; 364/148, 174, 431.05; 74/857, 859

[56]  References Cited

U.S. PATENT DOCUMENTS

| | | | |
|---|---|---|---|
| 3,886,915 | 6/1975 | Taplin | 180/179 |
| 4,047,507 | 9/1977 | Noguchi et al. | 123/344 |
| 4,424,568 | 1/1984 | Nishimura et al. | 364/431.05 |
| 4,475,506 | 10/1984 | Riordan | 123/352 |
| 4,502,442 | 3/1985 | Takakuwa et al. | 123/436 |
| 4,503,824 | 3/1985 | Ninomiya et al. | 123/436 |
| 4,582,038 | 4/1986 | Canta et al. | 123/436 |
| 4,638,778 | 1/1987 | Kamei et al. | 123/436 |
| 4,671,235 | 6/1987 | Hosaka | 123/352 |
| 4,745,553 | 5/1988 | Raven et al. | 364/431.05 |
| 4,771,848 | 9/1988 | Namba et al. | 123/352 |

FOREIGN PATENT DOCUMENTS

| | | | |
|---|---|---|---|
| 3403394 | 8/1985 | Fed. Rep. of Germany | 123/436 |
| 52-45852 | 11/1977 | Japan | 123/344 |
| 59-33874 | 9/1984 | Japan . | |

OTHER PUBLICATIONS

"Optimal Speed Control of Automobile Using Microprocessor" by Shuta Murakami et al, Transaction vol. 19, No. 7 of Society of Instrument and Control Engineers of Japan–Jul. 1983.
H. Kwakernaak, "Linear Optimal Control Systems", pp. 200–221, 276–281, 328–339, Wiley-Interscience, 1972.
G. F. Franklin, "Digital Control of Dynamic Systems", pp. 207–221. Addison-Wesley Publishing Company, 1981.
D. L. Stivender, "Engine Air Control-Basis of a Vehicular Systems Control Hierarchy", SAE pager 780346, 1978.

Primary Examiner—David M. Mitchell
Assistant Examiner—Eric Culbreth
Attorney, Agent, or Firm—Cushman, Darby & Cushman

[57]  ABSTRACT

In apparatus for controlling speed of a vehicle having an internal combustion engine and a power transmission mechanism as a controlled object, intake airflow, vehicle speed are detected and then an air-fuel mixture supply is controlled so that the vehicle travelling speed approaches a given cruising speed. The cruising speed is set in accordance with detected vehicle speed, while a target intake airflow is set to correspond to minimum fuel amount capable of maintaining the cruising speed on the basis of a pattern of correlation between fuel amount and intake airflow predetermined in correspondence with the cruising speed. The apparatus comprises an integral-added optimal regulator for determining feedback amount(s) of controlled variable(s) of the air-fuel mixture supply unit on the basis of operating equation(s) used for estimating internal state of the controlled object predetermined in accordance with a dynamic model of the system relating to the controlled object.

3 Claims, 9 Drawing Sheets

APPARATUS FOR CONTROLLING VEHICLE SPEED

This is a continuation of application Ser. No. 830,139, filed Feb. 18, 1986, which was abandoned upon the filing hereof.

BACKGROUND OF THE INVENTION

1. Field of the Invention

This invention relates generally to apparatus for controlling vehicle speed, and particularly to such apparatus for maintaining a constant speed with minimum fuel consumption in accordance with a dynamic model of a system relating to a controlled object including an internal combustion engine of the vehicle and power transmission mechanism.

2. Prior art

According to a conventional constant-speed control apparatus for vehicles, such as automobiles, the travelling speed of a vehicle is detected by a vehicle speed detecting means, and then the opening degree of the throttle valve of an internal combustion engine of the vehicle is controlled so that the deviation of the detected vehicle speed from a preset constant speed is made zero. One example of such a conventional apparatus is disclosed in Japanese utility model publication after examination 59-33874 and also in U.S. Pat. No. 4,047,507 corresponding to the Japanese patent.

In such conventional control apparatus, it is desired that the vehicle travelling speed does not deviate from the constant speed, and to suppress possible deviation. Furthermore, it is also desired that the amount of fuel consumed by an internal combustion engine is made as small as possible.

However, in such conventional vehicle speed control apparatus, fuel amount control is effected independently of vehicle speed made through the adjustment of the throttle valve, and therefore, when it is intended to increase the response characteristic, interference occurs between these two control systems. More specifically, when vehicle speed lowers, the throttle valve is opened to increase the vehicle speed, and then intake air quantity is increased to increase fuel amount. As a result, the vehicle speed is increased. Meanwhile, the fuel control system reduces the amount of fuel so as to better fuel consumption. Accordingly, engine output is reduced resulting in lower vehicle speed. In this way, the above-mentioned control steps are repeatedly performed resulting in hunting. As a result, the vehicle speed fluctuates around a given value.

In such conventional vehicle speed control apparatus, the response characteristic of the control system is not satisfactory since the control system is not based on dynamic characteristic, such as inertial mass. Therefore, when a vehicle is driven on a hilly road which goes up and down, the vehicle speed drastically varies.

SUMMARY OF THE INVENTION

The present invention has been developed in order to remove the above-described drawbacks inherent to the conventional apparatus for controlling vehicle speed.

It is, therefore, an object of the present invention to provide a new and useful apparatus for controlling vehicle speed with which vehicle speed during cruising is securely set to a constant speed with intake air quantity causing minimum fuel consumption using so called modern control theory.

According to a feature of the present invention, undesirable hunting in vehicle speed is effectively prevented while response characteristic is improved, and variation in vehicle speed is suppressed to a negligibly small value even if a motor vehicle is driven on hilly roads since multi-variable feedback control according to modern control theory is applied.

According to a further feature of the present invention, minimum fuel consumption amount can be ensured irrespective of secular change or variations among dimensions of the engine and its peripheral devices since minimum fuel consumption amount is found through learning logic.

According to a feature of the present invention, a target intake air quantity is determined as a value which makes fuel supply amount minimum on the basis of correlation between intake air quantity and fuel supply amount when travelling speed is made constant, and its control means is constructed as an integral-added optimal regulator which determines the amount of feedback on the basis of an optimal feedback gain predetermined according to the dynamic model of the system relating to the operation of a controlled object including an internal combustion engine.

In accordance with the present invention there is provided apparatus for controlling speed of a vehicle having an internal combustion engine and a power transmission mechanism as a controlled object, comprising: intake airflow rate detecting means for producing an intake airflow signal indicative of intake airflow to the internal combustion engine; vehicle speed detecting means for producing a vehicle speed signal indicative of the travelling speed of the vehicle; air-fuel mixture supply means through which air and fuel are supplied to the internal combustion engine, the speed of the vehicle being controlled through adjustment of airflow and/or fuel amount supplied to the engine; cruising speed setting means for setting a constant cruising speed in accordance with the vehicle speed signal when cruising mode is designated; target intake airflow setting means for setting intake airflow corresponding to minimum fuel amount capable of maintaining the cruising speed on the basis of a pattern of correlation between fuel amount and intake airflow predetermined in correspondece with the cruising speed; and an integral-added optimal regulator for determining, in receipt of the target intake airflow, the cruising speed, and control input and output value(s) of the controlled object, feedback amount(s) of controlled variable(s) of the air-fuel mixture supply means on the basis of operating equation(s) used for estimating internal state of the controlled object predetermined in accordance with dynamic model of the system relating to the controlled object, and also on the basis of an optimal feedback gain, the integral-added optimal regulator then outputting one or more control signals based on the determined feedback amount(s) to the air-fuel mixture supply means.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
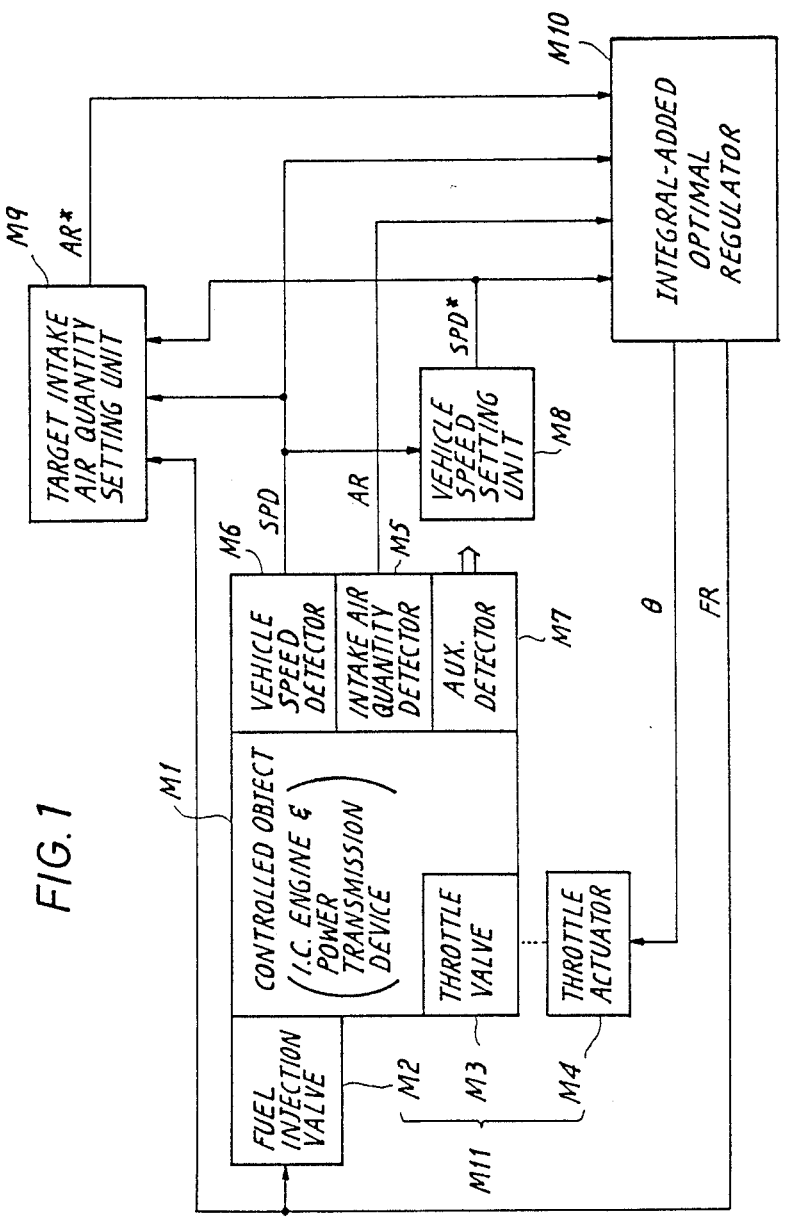
FIG. 1 is a schematic diagram showing basic structure of the present invention.

Referring now to FIG. 1, a schematic diagram is shown for describing basic structure of the present invention. As a controlled object is taken an internal combustion engine and power transmission mechanism of a motor vehicle. The controlled object is denoted at a reference M1, and the throttle valve M3 of the engine is responsive to a throttle actuator M4 which is responsive to a signal $\theta$ from an integral-added optimal regulator M10 described hereinlater. The controlled object M1 is equipped with one or more fuel injection valves M2, an intake airflow rate or air quantity detecting means or unit M5, a vehicle speed detecting means or unit M6, and auxiliary detecting means or unit M7. The combination of the fuel injection valve M2, the throttle valve M3 and the throttle actuator M4 is referred to as an air-fuel mixture supply means or unit. The control system of FIG. 1 further comprises a target intake airflow setting means or unit M9 and a vehicle speed setting means or unit M8. The above-mentioned various means or units are mutually related to form apparatus for controlling vehicle speed such that the apparatus comprises: the air-fuel mixture supply means M11 through which air and fuel are supplied to an internal combustion engine of the controlled object M1; the intake airflow rate detecting means M5, the vehicle speed detecting means M6, and the auxiliary detecting means M7, the speed of the vehicle being controlled through adjustment of airflow and/or fuel amount supplied to the engine; a cruising speed setting unit M8 for setting a constant cruising speed in accordance with the vehicle speed signal when cruising mode is designated; a target intake airflow setting unit M9 for setting intake aiflow corresponding to minimum fuel amount capable of maintaining the cruising speed on the basis of a pattern of correlation between fuel amount and intake airflow predetermined in correspondence with the cruising speed; an integral-added optimal regulator M10 for determining, in receipt of the target intake airflow, the cruising speed, and control input and output values of the controlled object M1, feedback amounts of controlled variables of the air-fuel mixture supply means M11 on the basis of operating equations used for estimating internal state of the controlled object M1 predetermined in accordance with dynamic models of the system relating to the controlled object M1, and also on the basis of an optimal feedback gain. The integral-added optimal regulator M10 then outputs one or more control signals based on the determined feedback amounts to the air-fuel mixture supply means M11.

The controlled object M1 comprises an internal combustion engine and a power transmission mechanism. The fuel injection valves 2 provided to the intake manifold feed the engine with fuel and this fuel amount or fuel flow rate is represented by the reference FR. The throttle valve M3 is controlled by the throttle actuator M4 so that the opening degree of the throttle valve is $\theta$. The intake airflow sensor M5 detects the rate of intake airflow sucked into the engine through the intake passage. The vehicle speed sensor M6 detects the travelling speed of the vehicle. Another sensor M7 represents an engine coolant sensor or the like which is used in known engine control systems. The target vehicle speed setting unit M8 sets a target vehicle speed SPD* using the actual vehicle speed according to the driver's demand.

The above-mentioned apparatus or units M1 through M8 may be implemented by known devices.

The target intake airflow setting unit M9 is arranged to set an intake airflow value which minimizes fuel supply amount at a given vehicle speed as follows:

The target intake airflow setting unit M9 searches a value of airflow rate at which a vehicle speed SPD can be maintained with minimum fuel amount using fuel amount FR, vehicle speed SPD and target vehicle speed SPD*, and then sets the target intake airflow rate AR* to this value.

Figure 2:
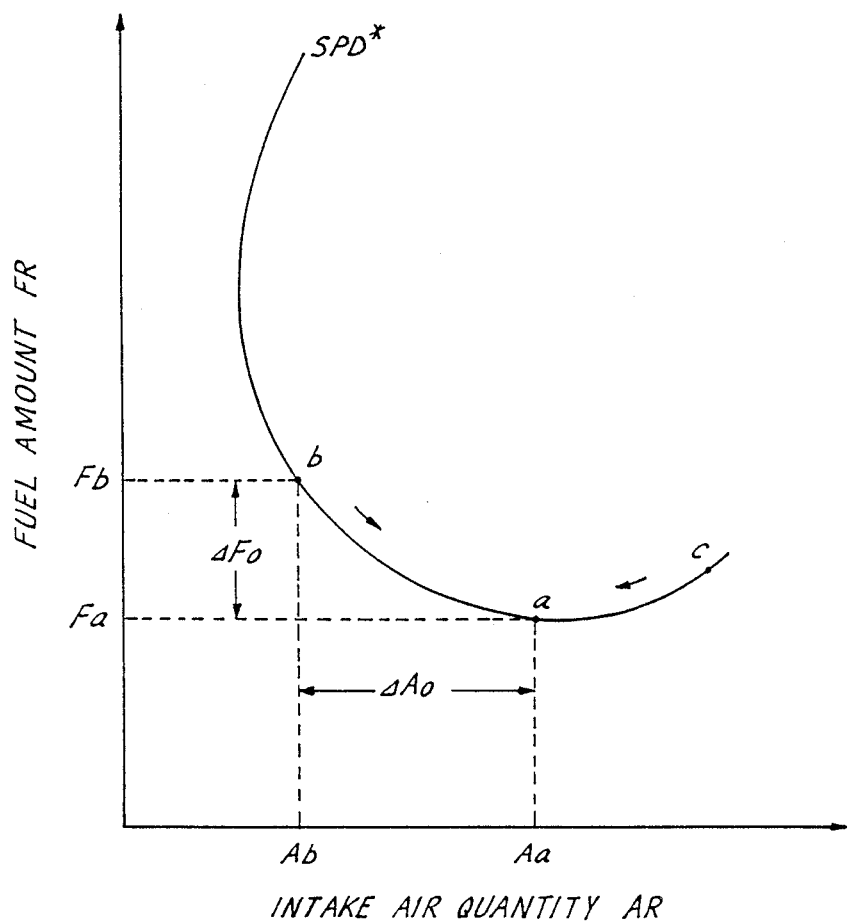
FIG. 2 is a cruising speed diagram showing the relationship between fuel amount and intake air quantity during cruising of an automobile.

FIG. 2 is a cruising speed diagram showing the relationship between fuel supply amount FR and intake air quantity AR during cruising of an automobile. Assuming that a motor vehicle is travelling at a point "b" where intake air quantity is Ab and fuel supply amount is Fb, it will be understood that the same vehicle speed is maintained as before even if intake air quantity is incremented by $\Delta$Ao and fuel supply amount is decremented by $\Delta$Fo (see point "a" defined by Aa and Fa) so that fuel supply amount FR becomes minimum. While the target intake air quantity setting unit M9 is arranged to determine intake air quantity, which gives minimum fuel supply amount FR with which a predetermined cruising speed SPD$\theta$ is maintained, this unit M9 is actualized by the following electronic control apparatus.

The integral-added optimal regulator M10 controls the vehicle speed SPD to be equal to the target vehicle speed SPD* by adjusting the throttle opening degree $\theta$ and fuel flow rate FR and also controls the intake airflow rate AR to be equal to the target intake airflow rate AR*. The structure and operation of the integral-added optimal regulator will be described hereinlater.

The electronic control apparatus comprises a microprocessor (MPU), and memories, such as ROMs and RAMs, and pheripheral elements and units including input/output devices. The MPU is arranged to perform control so that the travelling state of the vehicle approaches a target state by knowing a target value set by the cruising speed setting unit M8 and variables of the controlled object M1, using feedback amount which is determined by an optimal feedback gain determined by dynamic model of the system relating to the prime mover of the vehicle and power transmission mechanism of the vehicle. To this end, the electronic control apparatus comprises an integral-added optimal regulator which determines optimal feedback gain using the target intake air quantity set by the target intake air quantity setting unit M9 and the variable(s) of the controlled object M1.

A method of constituting such integral-added optimal regulator is described in detail in documents, such as "Linear System Control Theory" written by Katsuhisa FURUTA published by Shokodo Japan in 1976 or such as "Linear Optimal Control Systems" written by Huibert KWAKERNAAK published by Wiley-Interscience U.S.A. in 1972. An outlook for the method of actual forming of such regulator will be given hereinbelow. In the following description, the references F, X, A, B, C, y, u, L, G, Q, R, T, P indicate vectors (matrix), a superscript $T$ such as $A^T$ indicating transposed matrix, a superscript $-1$ such as $A^{-1}$ indicating inverse matrix, a symbol $\wedge$ such as $\hat{X}$ indicating an estimate, a symbol $-$ such as $\bar{C}$ indicating an amount handled by another system, i.e. a state observer (which will be simply referred to as observer hereinafter) which amount is generated by way of transform or the like from the system which is a controlled object, a symbol * such as y* indicating a target value respectively.

It is known in modern control theory that in a control of a controlled object, i.e. the internal combustion engine and power transmission mechanism, the dynamic behavior of the controlled object is described in discrete-time system as:

$$X(k) = A \cdot X(k-1) + B \cdot u(k-1) \qquad (1)$$

$$Y(k) = C \cdot X(k) \qquad (2)$$

The above Eq. (1) is called a state equation, and Eq. (2) is called an output equation, and a term X(k) indicates state variables which represent the internal state of the controlled object M1, a term u(k) indicates vectors comprising variables indicative of control input of the controlled object M1, and a term y (k) indicates vectors comprising variables representing the control output of the controlled object M1. The Eqs. (1) and (2) are both described in discrete-time system, and a subscript "k" indicates that the value is of the present time, while a subscript "k−1" indicates that the value is of an instant which is one sampling cycle before the present time.

The state variables X(k) indicating the internal state of the controlled object M1 represents information relating to the history of the system which is necessary and sufficient for predicting the influence in future in the control system. Therefore, the dynamic model of the system relating to the operation of the controlled object M1 will be clear, and if we can determine vectors A, B and C of Eqs. (1) and (2), then it is possible to optimally control the controlled object using the state variables X(k). In a servo system, while the system has to be expanded, this will be described hereinlater.

It is difficult to accurately theoretically obtain dynamic models of a complex objective such as the controlled object M1 including an internal combustion engine M1, and therefore, it is necessary to obtain the same through experiments. This is a method of constructing a model, which method is so called system identification, and in the case that the controlled object M1 is operated under a given state, the model is constructed according to state equation (1) and output equation (2) with which linear approximation is satisfied around the given state. Therefore, although the dynamic model related to the operation is of nonlinear in the case that the controlled object M1 includes an internal combustion engine, linear approximation can be performed by dividing into a plurality of normal operating states, and therefore it is possible to determine each dynamic model.

If the controlled object is of a sort that a physical model can be relatively easily constructed, then the model (i.e. vectors A, B, and C) of a dynamic system can be determined through system identification which can be made through a method such as frequency response method or spectrum analysis. However, in the case of controlled object of multivariable system, such as the internal combustion engine, it is difficult to make a physical model which is accurately approximated, and in such a case, dynamic model is constructed through least square method, instrumental variable method or on-line identification.

Once a dynamic model is determined, an amount of feedback is determined from the state variables X(x), control output y(k) and its target value y*(k), so that the control input u(k) is theoretically and optimally determined. In a system including an internal combustion engine and power transmission mechanism, as variables directly influencing on the operation of the internal combustion engine, such as air quantity actually sucked and the dynamic behaviour of combustion, or fuel amount within the mixture related to combustion, output torque of the internal combustion engine, may be treated as the state variables X(k). However, most of such variables are difficult to be directly measured. Therefore, means called state observer (observer) is formed within the electronic control unit so that it is possible to estimate the state variables X(k) of the system using the control input and the control output of the system. This is the observer according to modern control theory, and various types of observer and their designing methods are known. These are described in detail, for instance, in "Mechanical System Control" written by Katsuhisa Furuta, published from Ohm Co. Ltd. in 1984 and also in "Linear Optimal Control Systems" written by Huibert KWAKERNAAK published by Wiley-Interscience U.S.A. in 1972, and the observer may be designed as a minimal order obsersver or a finite time settling observer in correspondence with the fashion of an applied controlled object, i.e. a system whose main parts are the internal combustion engine and power transmission mechanism.

The electronic control unit controls the fuel injection valves M2 and the throttle actuator M4, in a system expanded using measured state variables or state variables X(k) estimated by the above-mentioned observer and an accumulated value obtained by accumulating the differences between a target intake air quantity set by the target intake air quantity setting unit M9 and actual intake air quantity as well as an accumulated value of the differences between the cruising speed set by the cruising speed setting unit M8 and an actual vehicle travelling speed, by determining an optimal feedback amount from both thereof and also from a predetermined optimal feedback gain. These accumulated values are necessary since the target value of the operating state varies depending on the amount of demand to the controlled object M1. In a control of a servo system, it is required generally to perform a control for cancelling steady-state error between the target value and an actual controlled variable, and this corresponds to the necessity of inclusion of $1/S^l$ (integration of $l^{th}$ order) in a transfer function. In the case that a state equation is made with the transfer function of the sytem being determined through system identification as described in the above, it is preferable to include such integrated amount in view of stability against noise. In the present invention, l=1, namely, integration of first order may be considered. Therefore, when the accumulated value is introduced into the above-mentioned state variable X(k) to expand the system so as to determine the feedback amount from these values and a predetermined optimal feedback gain F, the control input to the controlled object, is determined as an integral-added optimal regulator.

Nextly, it will be described in connection with optimal feedback gain. In an optimal regulator to which an integral element is added as described in the above, the way of finding a control input which minimizes a performance index J is made clear, while it is also known that the optimal feedback gain can be obtained from a solution of Riccati equation, A, B, C matrixes of the state equation (1) and the output equation (2), and the weighted parameter used in performance index (see the above-mentioned book). In the above, the weighted parameter is initially arbitrarily given so as to change the weighting in the regulation, by the performance index J, of the behavior of the internal combustion engine and so on. It is possible to determine an optimal value through repetition of simulation by changing the weighted parameter by a given amount from behavior which is obtained as the result of siumulation performed by a large computer with an arbitrary weighted parameter being given. As a result, an optimal feedback gain F is also determined.

Therefore, the electronic control unit in the apparatus for controlling an internal combustion engine according to the present invention is formed as an integral-added optimal regulator using a dynamic model of the internal combustion engine and so on which dynamic model is determined in advance through system identification, and the parameter of the observer therein and an optimal feedback gain F and so on are determined in advance through simulation using the internal combustion engine and power transmission mechanism.

While it has been described that the state variable X(k) is an amount indicating the internal state of the internal combustion engine and so on, this is not required to be a variable corresponding to actual physical amount, and therefore, this may be designed as a vector of an appropriate order.

The apparatus for controlling vehicle speed according to the present invention having the above-described structure operates such that intake air quantity corresponding to a minimum fuel supply amount, with which a costant cruising speed can be maintained, is determined by the target intake air quantity setting unit M9, and the internal combustion engine is operated with such quantity of intake air and such minimum fuel amount. As a result, it is expected that the vehicle travelling speed is controlled to a constant cruising speed with the minimum fuel supply amount. Furthermore, since the control means is constrcuted on the basis of modern control theory, it is also expected that the deviation of the vehicle travelling speed from the constant cruising speed during cruising is suppressed to a very small value.

Figure 3:
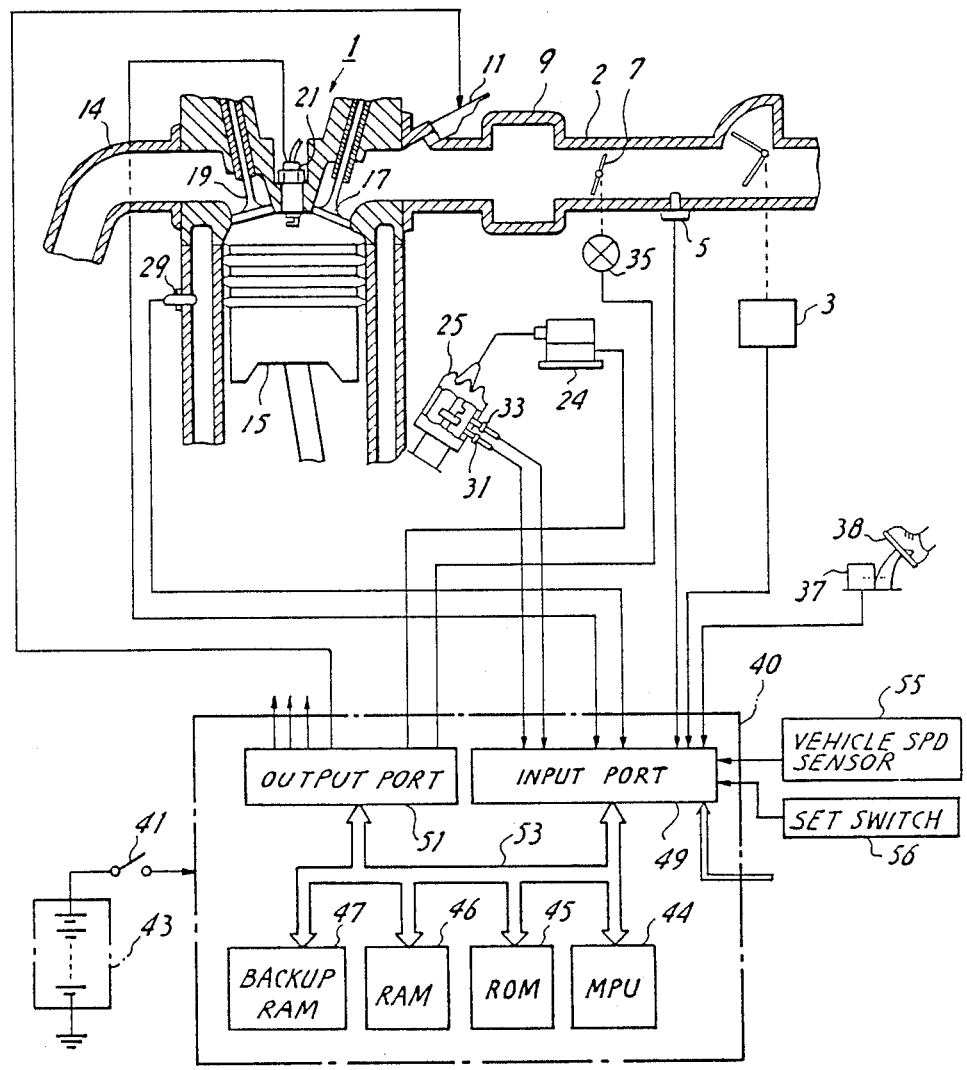
FIG. 3 is a schematic diagram showing an internal combustion engine and its peripheral elements as an embodiment of the present invention.
Figure 4:
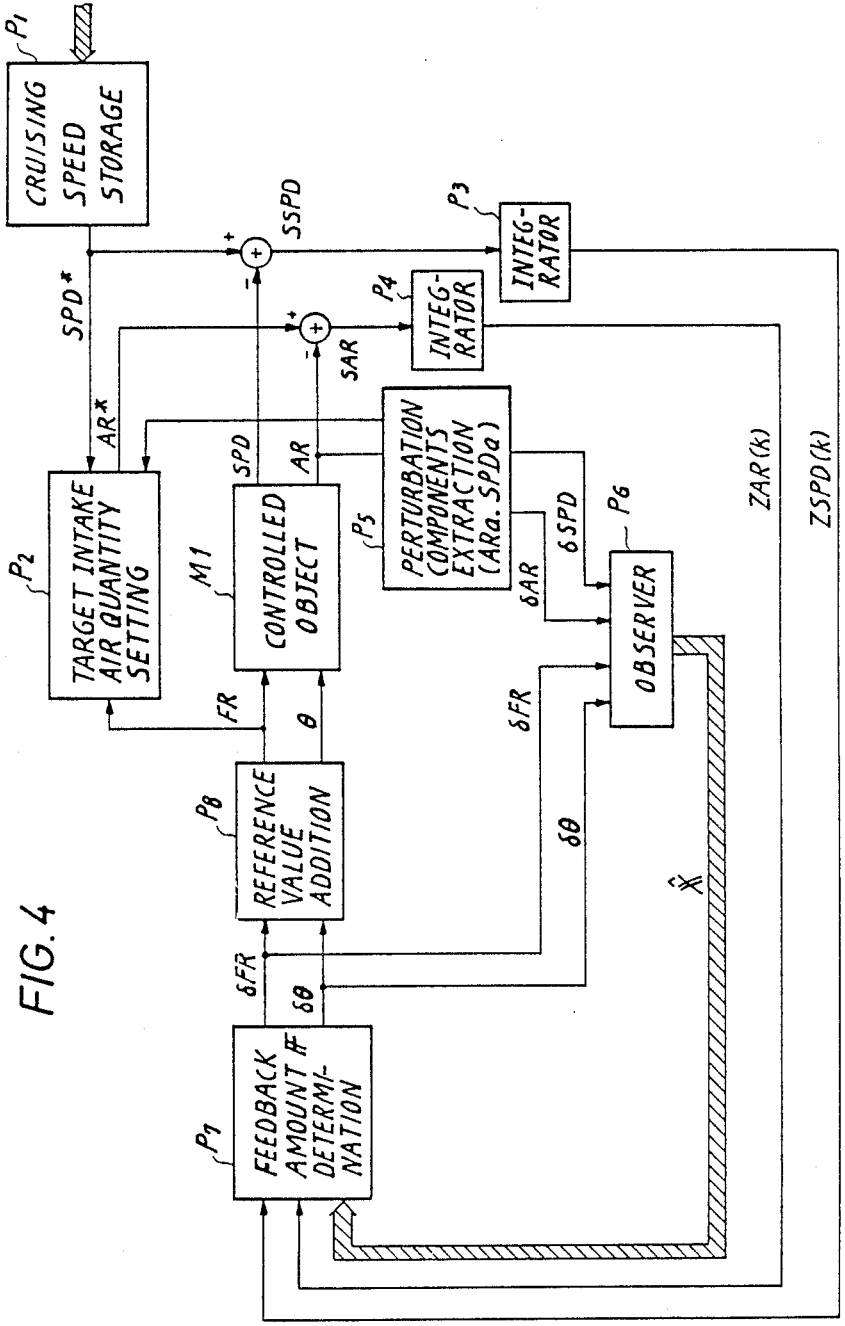
FIG. 4 is a diagram of a control system of the embodiment of FIG. 3.
Figure 5:
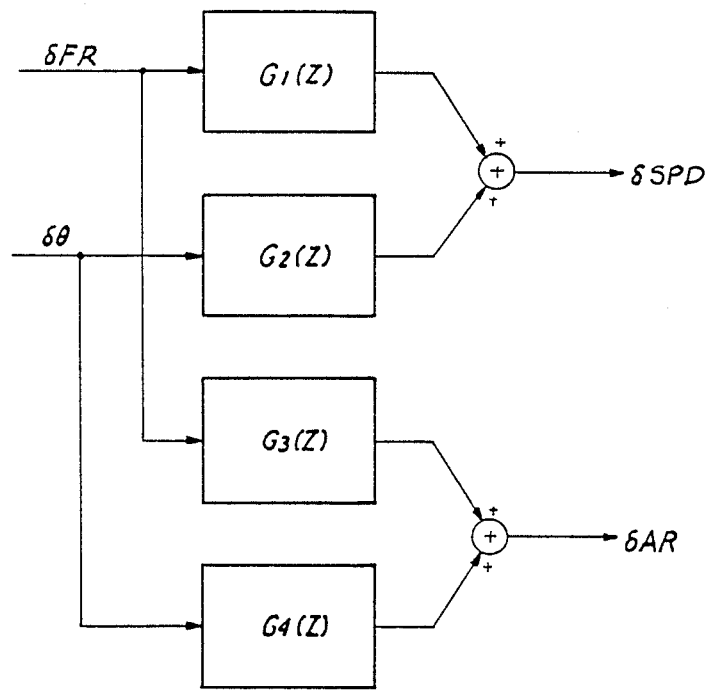
FIG. 5 is a block diagram used for identifying a model of the system of the embodiment of FIGS. 3 and 4.
Figure 6:
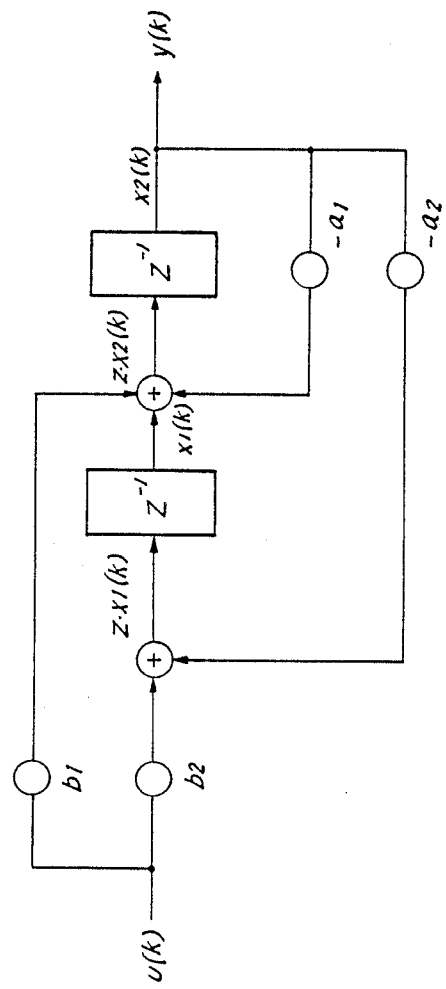
FIG. 6 is a signal flow diagram used for obtaining transfer function.
Figure 7:
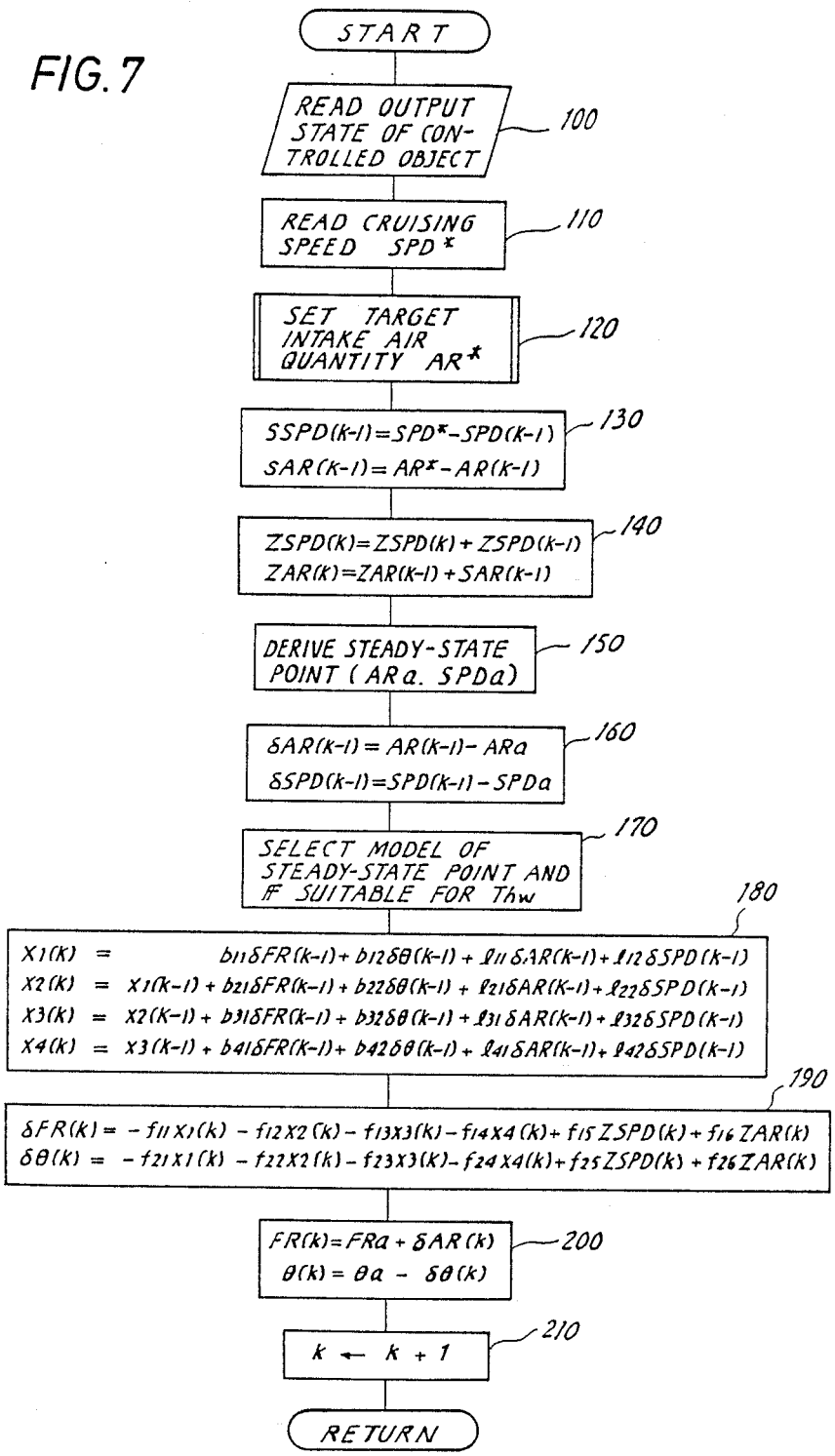
FIG. 7 is a flowchart showing a control as an integral-added optimal regulator in the embodiment.
Figure 8:
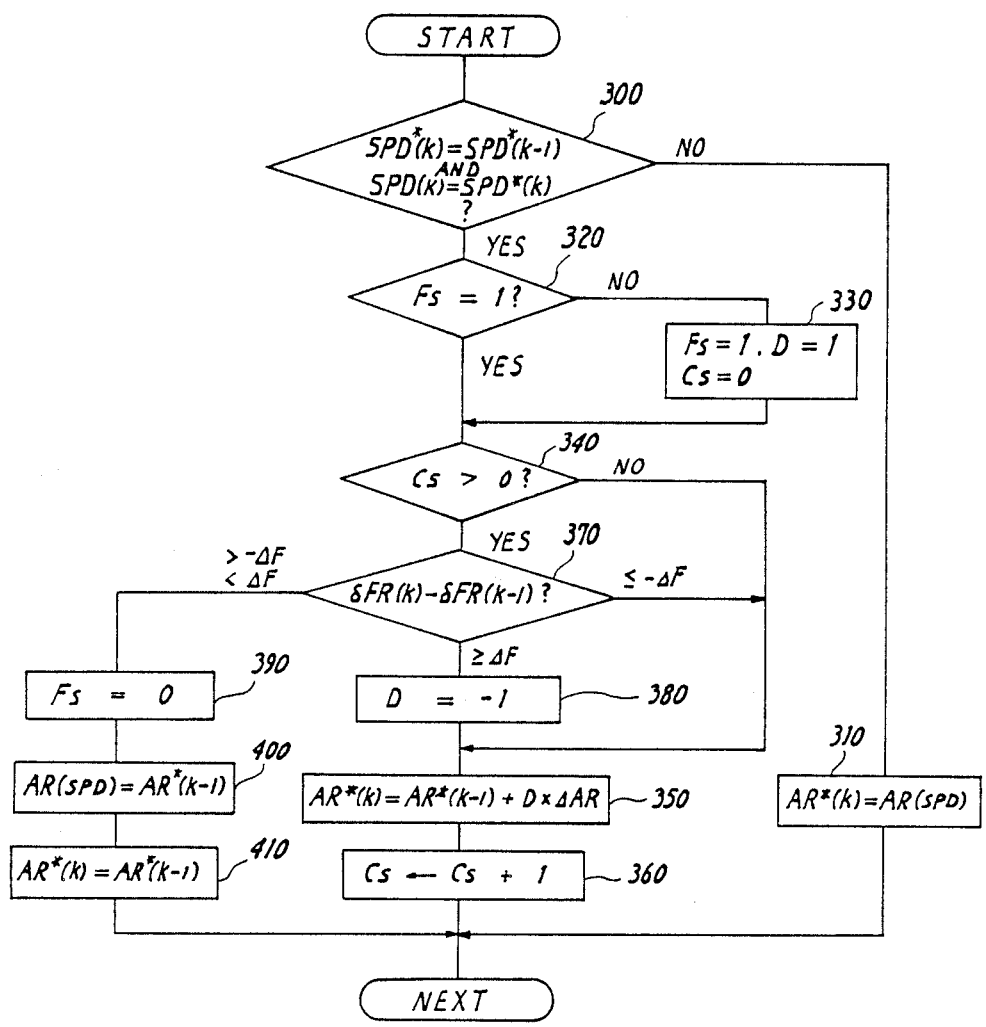
FIG. 8 is a flowchart showing a control routine for minimizing fuel consumption amount.

Embodiments of the present invention will be described with reference to drawings in detail. FIG. 3 is a schematic structural diagram showing an internal combustion engine and its peripheral units used in an embodiment of the apparatus for controlling vehicle speed according to the present invention; FIG. 4 is a control system diagram showing a control model of a system where operating state of the internal combustion engine is controlled; FIGS. 5 and 6 are block diagrams for the description of system identification; FIG. 7 is a flowchart showing one example of a control executed by an electronic control circuit; FIG. 8 is a flowchart showing one example of a control for obtaining intake air quantity with which fuel compution is made minimum: and the description will be given in this order.

Although FIG. 3 shows a four-cylinder four cycle internal combustion engine 1 in connection with only one cylinder, there are provided, in an order from upstream portion, an unshown air cleaner, an airflow meter for mesuring intake air quanitity AR, an intake air temperature sensor 5 for detecting an intake air temperature Tha, a throttle valve 7 for controlling intake air quantity, a surge tank 9, and electromagnetic fuel injection valves 11. Exhaust gasses from the internal combustion engine 1 are exhausted outside from an exhaust pipe 14 via an unshown exhaust gas cleaner, muffler and so on. While a comubstion chamber (cylinder) is formed of a piston 15, an intake valve 17, an exhaust valve 19, a spark plug 21 and so on, description of the operation thereof is omitted since it is well known.

In addition to these, the internal combustion engine 1 comprises a coolant temperture sensor 29 for detecting the temperature Thw of the coolant, a rotational speed sensor 31 installed in the distributor 25 for outputting a pulse signal having a frequency corresponding to the rotational speed N of the internal combustion engine 1, an a cylinder-determination sensor 33 for outputting a one-shot pulse per one revolution (720° crank angle) of the internal combustion engine 1. The opening degree of the throttle valve 7 is controlled by a throttle actuator 35 whose prime mover is a d.c. motor. In FIG. 3, the reference 37 is an accelerator opening degree sensor for detecting the stroke of the accelerator 38.

In the internal combustion engine 1 and its peripheral devices having the above-mentioned structure the fuel injection amount FR, throttle valve opening degree $\theta$ and so on are controlled by an electronic control circuit 40. The electronic control circuit 40 is supplied with electrical power from a battery 43 via a key switch 41, and comprises a well known microprocessor (MPU) or central processing unit (CPU) 44, ROM 45, RAM 46, backup RAM 47, input port 49, output port 51, and so on, where the above-mentioned respective elements and ports are interconnected via a bus 53.

The input port 49 of the electronic control circuit 40 receives signals indicative of the operating state of the internal combustion engine 1 and its operating state from respective sensors. More specifically, it comprises an unshown input units for respectively receiving intake air quantity AR from the airflow meter 3, intake air temperature Tha from the intake air temperature sensor 5, vehicle speed from a vehicle speed sensor 55 which produces a signal indicative of the vehicle speed, coolant temperature Thw from the coolant temperature sensor 29, rotational speed N of the internal combustion engine 1 from the rotational speed sensor 31, cylinder-determination signal from the cylinder-determination sensor 33, and a signal from a set switch 56 for determining whether cruising mode has been designated or not.

On the other hand, the output port 51 outputs control signals for respectively controlling opening degree $\theta$ of the throttle valve 7 via an actuator 35, fuel injection amount FR by opening and closing the fuel injection valves 11, and ignition timing via an igniter 24. The control by the MPU 44 of the electronic control circuit 40 will be described hereinlater in detail with reference to flowcharts of FIGS. 6 and 7.

Now, the control system within the electronic control circuit 40 will be described with reference to a functional block diagram of FIG. 4, and especially, it will be by the way of vectors A, B, C of the state equation (1) and output equation (2) by way of system identification and the way of obtaining observer and feedback gain F based thereon taking actual examples. FIG. 4 is a diagram showing functional blocks, and does not show hardware structure. Furthermore, the control system shown in FIG. 4 is realized by executing a series of programs shown in the flowchart of FIG. 6 in practice, and is realized as a discrete-time system.

In FIG. 4, the constant cruising speed SPD* is a vehicle speed at an instant where the set switch 56 is turned off, and this speed is stored into a cruising speed setting unit or storage P1. On the other hand, a target intake air quantity AR* is determined as a value which causes minimum fuel consumption amount by a target intake air quantity setting unit P2 through a method which will be described in detail with reference to FIG. 8 hereinlater, using the cruising speed SPD*, an actually detected travelling speed SPD, and fuel injection amount FR injected into the internal combustion engine 1. The integrator P3 is used for obtaining an accumulated value ZSPD(k) by accumulating the deviations SSPD of the actual travelling speed from the cruising speed SPD, while the other integrator P4 is used for obtaining an accumulated value ZAR(k) accumulating deviations SAR of actual intake air quantity AR from the target intake air quantity AR*.

The reference P5 indicates a perturbation component extracting portion which extracts a perturbation component from various values (ARa, Na) under the state where steady operating state in connection with intake air quantity AR and rotational speed N. This is based on the fact that the dynamic model covering a wide range of the controlled object M1 is constructed by constructing linear dynamic models in connection with a plurality of operating states by regarding the state of the internal combustion engine 1 as the continuance of such plurality of steady states in order to perform linear approximation for a nonlinear model. Therefore, variables (AR, SPD) of the controlled object 1 are handled as a perturbation component $\delta AR$ ($=AR-ARa$), $\delta SPD$ ($=SPD-SPDa$) relative to a predetermined nearest operating point. The control input to the controlled object M1, i.e. throttle opening degree $\theta$, a controlled variable relating to the fuel injection amount FR, which are obtained by the above-mentioned integrators P3, P4, the observer P6 and the feedback amount determining unit P7, are also handled as perturbation components $\delta\theta$ and $\delta FR$.

The observer P6 obtains state estimated variables $\tilde{X}(k)$ by estimating state variables X(k) which respresent the internal state of the controlled object 1 using the perturbation component $\delta\theta$ and $\delta FR$ of the control input and the perturbation components $\delta AR$ and $\delta SPD$ of the control output, and then the state estimated variables $\tilde{X}(k)$ and the above-mentioned accumulated value ZSPD(k) and ZAR(k) are multiplied by the optimal feedback gain F in the feedback amount determining portion P7 so as to obtain the manipulation amounts ($\delta\theta$, $\delta FR$). Since the set of the manipulation amounts ($\delta\theta$, $\delta FR$) are perturbation components relative to control input corresponding to steady operating state selected by the perturbation component extracting portion P5, the variables $\theta$ and FR of the operating condition of the controlled object M1 are determined by adding reference setting values $\theta a$ and FRa corresponding to the steady operating state to the perturbation components by a reference setting value adding portion P8.

While the structure of the control system has briefly been described, the reason that the control outputs (AR, SPD) and the control inputs ($\theta$, FR) are used in this embodiment, is that these variables are basic values relating to the outputs of the controlled variable M1. Therefore, in this embodiment, the controlled variable M1 is grasped as a multivariable system of two inputs and two outputs. In addition to these, ignition timing and exhaust gas recirculation amount, for example, may be used as the amounts relating to the output of the controlled variable M1, and these may be taken into consideration when constructing a model of the system. The above-mentioned model having two inputs and two outputs is used for constructing the dynamic model of the controlled object M1, and in addition to these coolant temperature Thw and intake air temperature Tha of the internal combustion engine 1 are also used as factors which change the dynamic behaviour of the system. The coolant temperature Thw and so on do not change the structure of the control system of the controlled object M1 but changes the state of dynamic behaviour thereof. Therefore, when the dynamic model is constructed in connection with the control system of the controlled object M1, the vectors A, B, C of the state equation (1) and the output equation (2) are determined in accordance with the coolant temperature Thw and so on of the internal combustion engine 1.

Hereinabove, the hardware structure of the internal combustion engine 1 and the structure of the control system have been described taking a system of two inputs and two outputs as an example which controls the output of the controlled object M1. Now it will be described about the construction of a dynamic model through actual system identification, the designing of the observer P6, and how to give the optimal feedback gain F.

First of all, a dynamic model of the controlled object M1 is constructed. FIG. 5 is a diagram showing a system of the controlled object M1 under steady state operation as a system having two inputs and two outputs by way of transfer functions G1(z) through G4(z). Where G1(z) represents a transfer function wherein the input is a perturbation component $\delta FR$ of fuel flow rate and the output is a perturbation component $\delta SPD$ of the vehicle speed. Similarly, G2(z) represents a transfer function wherein the input is a perturbation component $\delta\theta$ of throttle valve opening degree and the output is a perturbation component $\delta SPD$ of the vehicle speed, G3(z) being a transfer function wherein the input is a perturbation component $\delta FR$ of fuel flow rate and the output is a perturbation component $\delta AR$ of the intake air quantity, and G4(z) being a transfer function wherein the input is a perturbation component $\delta\theta$ and the output is a perturbation component $\delta AR$ of the intake air quantity. The reference z indicates z transformation of sampled values of the input/output signals, and it is assumed that G1(z) through G4(z) have an appropriate order. Therefore, entire transfer function matrix G (z) is given by:

$$G(z) = \begin{bmatrix} G1(z) & G2(z) \\ G3(z) & G4(z) \end{bmatrix}$$

When there exists an interference in the input/output variables, where the system is of two inputs and two outputs as in the controlled object M1 of this embodiment, it is extremely difficult to determine a physical model. In such a case, it is possible to obtain transfer function through simulation, or the so called system identification.

The method of system identification is described in detail in "System Identification" written by Setsuo SAGARA published by Society of Instrument and Control Engineers (SICE) of Japan in 1981, and in "Digital Control of Dynamic Systems" written by Gene F. FRANKLIN published by Addison-Wesley Publishing Company U.S.A. in 1981; and identification is performed here through least square method.

METHOD OF LEAST SQUARES $$y(k) = (B(z^{-1})/A(z^{-1}))u(k) + v(k) \quad (4.2)$$

Cancelling the denominator, the above equation is rewritten as:

$$y(k) + a_1 y(k-1) + \ldots + a_n y(k-n)$$
$$= b_0 u(k) + b_1 u(k-1) + \ldots + b_n u(k-n) + e(k) \quad (4.3)$$

where $e(k) = v(k) + a_1 v(k-1) + \ldots + a_n v(k-n)$.

Now it is an object to determine $a_1, a_2, \ldots a^n, b_0, b_1, \ldots, b_n$ by observing $\{u(i)\}, \{y(i)\}(i=0, 1, 2, \ldots, N)$. Since $\{e(k)\}$ is a term based on nonmeasured observing noise, it is now possible to determine coefficients so that an equation, from which this term has been removed, will hold for most of observed input and output signals. This is a basic idea of method of least squares.

More specifically, a1, a2, ..., an, b0, b1, ..., bn are determined so as to minimize the following J:

$$\sum_{j=k=n}^{N} [\{y(k) + a_1 y(k-1) + \ldots + a_n y(k-n)\} - \{b_0 u(k) + b_1 u(k-1) + \ldots + b_n u(k-n)\}]^2 \quad (4.4)$$

GENERAL RESULTS OF ESTIMATION BY METHOD OF LEAST SQUARES

The following vectors and matrixes are defined as:

$$Y = [y(n), y(n+1), \ldots, y(N)]^T$$

$$\alpha = [a_1, -a_2, \ldots, -a_n, b_0, b_1, \ldots, b_n]^T$$

$$\Omega = \begin{matrix} y(n-1) \ y(n-2) \ldots y(0) \ u(n) \ u(n-1) & \ldots & u(0) \\ y(n) \ y(n-1) \ldots y(1) \ u(n+1) \ u(n) & \ldots & u(1) \\ y(N-1) \ y(N-2) \ldots y(N-n) \ u(N) \ u(N-1) & \ldots & u(N-n) \end{matrix}$$

$$e = [e(n), e(n+1), \ldots, e(N)]^T \quad (4.5)$$

An equation obtained by substituting rows of measured values $\{y(k)\}$ and $\{u(k)\}$ into Eq. (4.3) is given as:

$$Y = \Omega\alpha + e \quad (4.6)$$

Eq. (4.4) is rearranged as:
$$J = [y - \Omega\alpha]^T [y - \Omega\alpha] = \|y - \Omega\alpha\|^2 \quad (4.7)$$

A least square estimated value $\alpha$ of the factor $\alpha$ is a value of $\alpha$ which causes the following relationship:

$$\hat{\alpha} = \text{Min} J_0$$

The following definition is given:

$$\frac{\partial J}{\partial \alpha} = \left[ \frac{\partial J}{\partial \alpha_1} \ \frac{\partial J}{\partial \alpha_2} \ \ldots \ \frac{\partial J}{\partial \alpha_{2n+1}} \right]^T \quad (4.9)$$

where $\alpha_1$ is an $i^{th}$ element of vector $\alpha$.
By actually computing Eq. (4.9) we obtain:

$$\frac{\partial J}{\partial \alpha_i} = -2\omega_i^T [y - \Omega\alpha] \quad (4.10)$$

where i indicates $i^{th}$ row of the matrix.
Therefore, the vector given by Eq. (4.9) is written as follows by arranging Eq. (4.10):

$$\frac{\partial J}{\partial \alpha} = -2\Omega^T [y - \Omega\alpha] \quad (4.11)$$

The term $\alpha$ can be obtained using the following equation in which $J_0/\alpha$ is put as 0 an extreme value of J0.

$$\Omega^T \Omega \hat{\alpha} = \Omega^T y \quad (4.12)$$

In the above, if $[^T]^{-1}$ exists, the following relationship results:

$$\hat{\alpha} = [\Omega^T \Omega]^{-1} \Omega^T y \quad (4.13).$$

The controlled object M1 is put in a predetermined operating state, and the variation $\delta\theta$ of the throttle opening degree is made zero to add an appropriate test signal as the variation $\delta FR$ of the supplied fuel amount and data of input $\delta FR$ at this time and variation $\delta SPD$ of the travelling speed as an output is sampled N times. This is expressed as input data series of $\{u(i)\} = \{\delta FRi\}$ and as output data series of $\{y(i)\} = \{\delta SPDi\}$ wherein $i=1, 2, 3 \ldots N$. Here, the system can be regarded as having one input and one output, and thus the transfer function G1(z) is given by:

$$G1(z) = B(z^{-1})/A(z^{-1}) \quad (3)$$

Therefore, $$G1(z) = (b_0 + b_1 \cdot z^{-1} + \ldots + b_n \cdot z^{-n})/(1 + a_1 \cdot z^{-1} + a_2 \cdot z^{-2} + \ldots + a_n \cdot z^{-n}) \quad (4)$$

In the above, $z^{-1}$ is a unit shift operator indicating $z^{-1} \cdot x(k) = x(k-1\,1)$.

When we determine parameters a1 to an and b0 to bn of Eq. (4) from the input and output data series $\{u(i)\}$ and $\{y(i)\}$, transfer function G1(z) can be obtained. These parameters are determined in system identification using least square method so that the following assumes a minimal value:

$$J_0 \overset{\Delta}{=} \sum_{k=n}^{N} [\{y(k) + a_1 \cdot y(k-1) + \ldots + a_n \cdot y(k-n)\} - \quad (5)$$

-continued
$$\{b0 \cdot u(k) + b1 \cdot u(k-1) + \ldots + bn \cdot u(k-n)\}]^2$$

In the above Equation (5), the reference Jo indicates an evaluation function representing the sum of square of the difference between outputs y(k) obtained through experiments and the output by the model indicated by the Equation (3).

In this embodiment, respective parameters have been obtained assuming that n=2. In this case, a signal flow diagram of the system is as shown in FIG. 6, and using [X1 (k)] as state variables, state and output equations thereof can be expressed by Eqs. (6) and (7):

$$\begin{bmatrix} X1(k+1) \\ X2(k+1) \end{bmatrix} = z \begin{bmatrix} X1(k) \\ X2(k) \end{bmatrix} = \begin{bmatrix} 0 & -a2 \\ 1 & -a1 \end{bmatrix} \begin{bmatrix} X1(k) \\ X2(k) \end{bmatrix} + \begin{bmatrix} b2 \\ b1 \end{bmatrix} u(k) \quad (6)$$

$$y(k) = [0 \ 1] \begin{bmatrix} X1(k) \\ X2(k) \end{bmatrix} \quad (7)$$

The signal flow diagram of FIG. 6 is used for converting the transfer function represented by Eq. (4) into a state equation represented by Eq. (6), and mutual relationship between the parameters a1, a2, b1, and b2, the input u(k), the states x1(k), x2(k) and output y(k) is shown therein.

Therefore, using system parameters A1', B1', C1' for the parameters A, B, C in the case that the system is regarded as of one input and one output, we obtain:

$$A1' = \begin{bmatrix} 0 & -a2 \\ 1 & -a1 \end{bmatrix} \quad (8)$$

$$B1' = [b2 \ b1]^T$$

$$C1' = [0 \ 1]$$

Parameters $a_1$ to $a_n$ and $b_o$ to $b_n$ can be obtained as follows:

An output Y(k) can be given from Eq. (4) as follows:

$$y(k) + a_1 y(k-1) + \ldots + a_n Y(k-n)$$
$$= b_0 u(k) + b_1 u(k-1) + \ldots + b_n u(k-n) + e(k) \quad (5.1)$$

where e(k) is a term indicative of measured noise.
The following vectors and matrices are defined as:

$$y = [y(n), y(n+1), \ldots, y(N)]^T$$

$$\alpha = [-a1, -a2, \ldots, -an, b0, b1, \ldots, bn]^T$$

$$\Omega = \begin{matrix} y(n-1) \ y(n-2) \ldots y(0) \ u(n) \ u(n-1) & u(0) \\ y(n) \ y(n-1) \ldots y(1) \ u(n+1) \ u(n) & u(1) \\ \\ y(N-1) \ y(N-2) \ldots y(N-n) \ u(N) \ u(N-1) & u(N-n) \end{matrix}$$

An equation obtained by substituting rows of measured values $\{y(k)\}$ and $\{u(k)\}$ into Eq. (5.1) is given as:

$$Y = \Omega\alpha + e \quad (5.3)$$

Eq. (5) is rearranged as:

$$J_0 = [Y - \Omega\alpha]^T [Y - \Omega\alpha] = |y - \Omega\alpha|^2 \quad (5.4)$$

A least square estimated value $\hat{\alpha}$ of the factor $\alpha$ is a value of $\alpha$ which causes the following relationship:

$$\hat{\alpha} = \underset{\alpha}{Min} J_0 \quad (5.5)$$

The following definition is given:

$$\frac{\partial J_O}{\partial \alpha} = \frac{\partial J_O}{\partial \alpha_1} \ \frac{\partial J_O}{\partial \alpha_1} \ \ldots \ \frac{\partial J_O}{\partial \alpha_{2n+1}} \ T \quad (5.6)$$

where $\alpha$ is an $i^{th}$ element of vector $\alpha$.
By actually computing Eq. (5.6) we obtain:

$$\frac{\partial J_O}{\partial \alpha_i} = -2\omega_i^T [y - \Omega a] \quad (5.7)$$

where $w_i$ indicates the $i^{th}$ row of the matrix $\Omega$.
Therefore, the vector given by Eq. (5.6) is written as follows by arranging Eq. (5.7):

$$\frac{\partial J_O}{\partial a} = -2\Omega^T [Y - \Omega a] \quad (5.8)$$

The term $\hat{a}$ can be obtained using the following equation in which $\delta J_0/\delta\alpha$ is put as 0 as an extreme value of J0.

The term $\hat{a}$ can be obtained using the following equation in which $\delta J_0/\delta\alpha$ is put as 0 as an extreme value of J0.

$$\Omega^T \Omega \hat{a} = \Omega^T \cdot Y. \quad (5.9)$$

In the above, if $[\Omega^T\Omega]^{-1}$ exists, the following relationship results:

$$\hat{a} = [\Omega^T\Omega]^{-1} Y \quad (5.10)$$

In this embodiment, the following is obtained as the parameter in connection with G1(z):

$$[a1 \ a2] = [-1.91 \ 0.923]$$

$$[b0 \ b1 \ b2]$$

$$= [0 \ 4.86 \times 10^{-3} \ 4.73 \times 10^{-3}].$$

Through similar method transfer functions G2(z) through G6(z) as well as system parameters A2' through A4', B2' through B4', and C2' through C4' can be obtained. Therefore, using these system parameters, the system parameter of the original multivariable system of two inputs and three outputs, namely, vectors A, B, C of state equation (1) and output equation (2) can be determined.

In this way, the dynamic model of the present embodiment is obtained through system identification, and this dynamic model can be determined in the form that linear approximation is satisfied around a state where the controlled object M1 operated under a given state. Therefore, the transfer function G1(z) through G4(z) are respectively obtained through the above method in connection with a plurality of steady operating states, and vectors A, B, C in the respective state equations (1) and output equations (2) are obtained where the relationship between input and output thereof is satisfied between perturbation components δ.

Now the way of designing the observer P6 will be described. While as the way of designing is known as Gopinath's method, which is described in detail in "Basic System Theory" written by katsuhisa FURUTA and Akira SANO published from Corona Co. Ltd. in 1978, the observer is designed as a deadbeat observer in this embodiment.

The observer P6 is used for estimating the internal state variable X(k) of the controlled object M1 from the perturbation component (δAR, δSPD) of the variables of the control output of the controlled object M1 and from perturbation components (δθ,δFR) of the variables of the control input, and the reason why the state estimated variables $\hat{X}(k)$ obtained by the observer P6 can be handled as actual state variable X(k) in the control of the controlled object M1 will be made clear hereinbelow. Let us assume that the output $\hat{X}(k)$ from the observer P6 is constructed as the following Eq. (9):

$$\hat{X}(k) = (A - L \cdot C) \cdot \hat{X}(k-1) + B \cdot u(k-1) + L \cdot y(k-1) \quad (9)$$

In Eq. (9), L is a matrix arbitrarily given. Modifying Eqs. (1), (2) and (9), we obtain:

$$[X(k) - \hat{X}(k)] = (A \cdot L \cdot C)[X(k-1) - \hat{X}(k-1)] \quad (10)$$

Therefore, if the matrix L is selected so that an eigenvalue of the matrix (A−L·C) is located within a unit circle, $\hat{X}(k) \to X(k)$ with $k \to \infty$, and thus it is possible to accurately estimate the internal state variable X(k) of the controlled object M1 using series u(*), y(*), from the past, of the input control vector u(k) and the output vector y(k).

The vectors A, B, C of the state equation (1) and the output equation (2) both determined through system identification through least square method, can be similarity transformed into the following observable canonical structure considering new state variable $\overline{X}(k) = T^{-1} \cdot X(k)$ using nonsingular matrix T because the system is observable.

$$\overline{X}(k) = \overline{A0} \cdot \overline{X}(k-1) + \overline{B0} \cdot u(k-1) \quad (11)$$

$$y(k) = \overline{C0} \cdot \overline{X}(k) \quad (12)$$

In the above, $\overline{A0} = T^{-1} \cdot A \cdot T$, $\overline{B0} = T^{-1} \cdot B$, $\overline{C0} = C \cdot T$, and we obtain the following equations by selecting appropriate nonsingular T.

$$\overline{A0} = \begin{bmatrix} 0 & 0 & \ldots & & -\alpha 1 \\ 1 & 0 & \ldots & & -\alpha 2 \\ 0 & 1 & \ldots & & \cdot \\ \cdot & \cdot & & & \cdot \\ \cdot & \cdot & & & \cdot \\ 0 & 0 & \ldots & 1 & -\alpha n \end{bmatrix} \quad (13)$$

$$\overline{B0} = [\beta 1 \; \beta 2 \ldots \beta n]^T \quad (14)$$

$$\overline{C0} = [0 \; 0 \ldots 1] \quad (15)$$

Then, let L matrix be replaced as $L = [-\alpha 1 \; -\alpha 2 \ldots -\alpha n]^T$, and we can now design a finite time settling observer as follows using equations (13), (14) and (15):

$$\overline{A0} - L \cdot \overline{C0} = \begin{bmatrix} 0 & 0 & \ldots & & 0 \\ 1 & 0 & \ldots & & 0 \\ 0 & 1 & \ldots & & 0 \\ \cdot & \cdot & & & \cdot \\ \cdot & \cdot & & & \cdot \\ \cdot & \cdot & & & \cdot \\ 0 & 0 & \ldots & 1 & 0 \end{bmatrix} \quad (16)$$

In the above, $\overline{A0}$, $\overline{B0}$ and $\overline{C0}$ are obtained through similarity transformation using A, B, and C, and it is also ensured that the control by the state equation is correct from this operation.

While the observer P6 has been designed using the vectors A, B and C of the state equation obtained through system identification, the output of the observer is now expressed in terms of $\hat{X}(k)$ hereinafter.

Now the way of obtaining the optimal feedback gain F will be described. Since the way of obtaining optimal feedback gain F is described in detail in the above-mentioned "Linear System Control Theory", only the results are shown here with the detail thereof being omitted.

Using $$\delta u(k) = u(k) - u(k-1) \quad (17)$$

$$\delta y(k) = y(k) - y(k-1) \quad (18)$$

in connection with the variables u*(k) of the control input and the variables y(k) of the control output, obtaining an optimal control input u(k), which makes the following performance index J minimal, results in solving a control problem as an integral-added optimal regulator related to the control system of the controlled object M1.

$$J = \sum_{k=0}^{\infty} [\delta y^T(k) \cdot Q \cdot \delta y(k) + \delta u^T(k) \cdot R \cdot \delta u(k)] \quad (19)$$

In the above, Q and R indicate weighted parameter matrixes, and k indicates the number of sampling times which is zero at the time of beginning of control, while the right side of Eq. (19) is an expression of so called quadratic form using diagonal matrixes of Q and R.

Here, the optimal feedback gain F is given as follows:

$$F = -(R + \overline{B}^T \cdot P \cdot \overline{B})^{-1} \cdot \overline{B}^T \cdot P \cdot \overline{A} \quad (20)$$

In Eq. (20), A and B are given by:

$$\overline{A} = \begin{bmatrix} 1 & -\overline{C0} \cdot \overline{A0} \\ 0 & \overline{A0} \end{bmatrix} \quad (21)$$

$$\overline{B} = \begin{bmatrix} -\overline{C0} \cdot \overline{B0} \\ \overline{B0} \end{bmatrix} \quad (22)$$

Furthermore, P is a solution of the following Riccati equation:

$$P = A^T \cdot P \cdot A - A^T \cdot P \cdot B \cdot (B^T \cdot P \cdot B + R)^{-1} \cdot \quad (23)$$

-continued $$B^T \cdot P \cdot A + \begin{bmatrix} Q & 0 \\ 0 & 0 \end{bmatrix}$$

In the above, the performance index J in Eq. (19) has a meaning that it is intended to reduce the deviation of the operating state variables y(k), i.e. variables y(k) including the intake air quantity δAR, and the travelling speed δSPD, from the target value y*(k), with the variables $u(k)=[\delta\theta \delta FR]$ as the control inputs to the controlled object M1 being regulated. The weighting of regulation of the variables u(k) of control inputs can be altered by changing the values of the weighted parameter matrixes Q and R. Therefore, the state variables X(k) can be obtained as state estimated variables X(k) using Eq. (9) if we obtain the optimal feedback gain F using Eq. (20) by obtaining P solving Eq. (23) with arbitrarily weighted parameter matrixes Q, R being selected using the dynamic model of the controlled object M1, i.e. matrixes A, B, C (which correspond to the above-mentioned $\overline{A}, \overline{B}, \overline{C}$), which is obtained in advance. Therefore, the variables u(k) of the control input of the controlled object M1 can be obtained as follows:

$$u(k) = F \cdot [X1(k), X2(k) \ldots Xn(k)\ ZSPD(k)\ ZAR(k)]^T \quad (24)$$

By repeating simulation with the weighted parameter matrixes Q and R being altered until an optimal control characteristic is obtained, the optimal feedback gain F is obtained.

While it has been described about the construction of the dynamic models of the control system of the controlled object M1 made through system identification using least square method, the designing of finite time settling observer and the computation of the optimal feedback gain F, these are obtained in advance so that actual control is performed within the electronic control unit 40 using only the results thereof.

Now, an actual control performed by the electronic control circuit 40 will be described with reference to a flowchart of FIG. 7. In the following description, an amount handled in a present processing is expressed by a subscript (k) and an amount handled in the latest cycle by another subscript (k−1).

After the cruising mode is designated by the set switch 56, the MPU 44 executes repeatedly step 100 and following steps. At first in the step 100, the output state of the controlled object M1, i.e. the intake air quantity AR(k−1), vehicle travelling speed SPD(k−1) and so on, are read from respective sensors.

In a following step 110, when the set switch 56 is turned off, the cruising speed SPD stored in the the RAM 46 is read out, and then in a step 120, a target intake air quantity AR* of the internal combustion engine 1 is computed. This target intake air quantity AR* is determined so that the amount of fuel consumed by the internal combustion engine 1 is minimum, and the computation thereof is controlled as will be described hereinlater with reference to FIG. 8. These processings correspond to respective setting portions P1 and P2 of FIG. 7.

In a step 130, the deviation SSPD(k−1) of an actually detected travelling speed SPD(k−1) from the cruising speed SPD* and the deviation SAR(k−1) of actual intake air quantity AR(k−1) from the target intake air quantity AR* are respectively obtained. In a subsequent step 140, respective deviations obtained in the step 130 are accumulated to obtain accumulated value ZSPD(k) using $ZSPD(k) = ZSPD(k-1) + SSPD(k-1)$ and another accumulated value ZAR(k) using $ZAR(k) = ZAR(k-1) + SAR(k-1)$. This processing corresponds to the integrators P3 and P4 of FIG. 4.

In a following step 150, a nearest state (which will be referred to as operating points ARa, SPDa) among steady-state operating states taken as satisfying linear approximation when the dynamic model of the controlled object M1 is constructed, is obtained from the output state of the controlled object read in step 100. In a step 160, the output state of the controlled object M1 read in the step 100 is obtained as perturbation components (δAR, δSPD) relative to the steady state points (ARa, SPDa). This processing corresponds to the perturbation component extracting portion P5 of FIG. 4.

In a subsequent step 170, temperature Thw of the coolant of the internal combustion engine 1 is read, and sicne the dynamic model of the internal combustion engine 1 changes in accordance with the coolant temperature Thw, parameters A0, B0, L and optimal feedback gain F prepared within the observer in advance for respective coolant temperatures Thw are selected.

In a step 180, new state estimated value X(k) is obtained through the following equation (25) using A0, B0, L selected in the step 170, the perturbation components (AR, SPD) obtained in the step 160, state estimated value $X(k-1) = [X1(k-1)\ X2(k-2) \ldots X4(k-1)]^T$ obtained in the previous cycle, the perturbation component δFR(k−1), δθ(k−1) of the fuel injection amount FR(k−1) and the throttle valve opening degree θ(k−1) both obtained in the previous cycle. This processing corresponds to the observer P6 of FIG. 4, and the observer P6 is constructed as a finite time settling observer in this embodiment as described in the above. Namely, the following computation is performed:

$$\hat{X}(k) = [\overline{A0} - L\ \overline{C0}\,]\hat{X}(k-1) + \overline{B0} \cdot [\delta FR(k-1), \delta\theta(k-1)] + L\cdot[\delta AR(k-1)\ \delta SPD(k-1)] \quad (25)$$

In a following step 190, the state estimated value X(k) obtained in the step 180, the accumulated values ZSPD(k), ZAR(k) obtained in step 140, the feedback gain prepared in advance and selected in the step 170 which feedback gain is given by:

$$F = \begin{bmatrix} -f11 & -f12 & \ldots & -f14 & f15 & f16 \\ -f21 & -f22 & \ldots & -f24 & f25 & f26 \end{bmatrix}$$

are vector multiplied to obtain perturbation components δFR(k) and δθ(k) of the manipulation amount using $[\delta FR(k)\ \delta\theta(k)] = F \cdot [\hat{X}(k)\ ZSPD(k)\ ZAR(k)]^T$. This corresponds to the feedback amount determining portion P7 of FIG. 4.

In a step 200, the perturbation components δFR(k), δθ(k) of the manipulation amounts obtained in the step 190 are added to the respective manipulation amounts FRa, θa at the steady-state points, and the manipulation amounts FR(k), θ(k), actually outputted to the fuel injection valves 11 and the actuator 35 of the internal combustion engine 1 are obtained.

In a following step 210, the value "k" indicative of the number of times of samplings is incremented by 1, and the above-mentioned series of processings of steps 100 through 210 is terminated.

By continuously performing the above-mentioned control, the electronic control unit 40 performs control using an optimal feedback gain as an integral-added optimal regulator which controls the controlled object M1 to the cruising speed SPD* and to the target intake air quantity AR*.

Now will be described about a routine for obtaining the target intake air quantity AR* of the step 120. In this routine, as shown in a flowchart of FIG. 8, the target intake air quantity AR*, which makes fuel consumption amount minimum while the same travelling speed SPD(k) is maintained, is computed through the following steps. In the following description, the target value of the previous cycle may be expressed in terms of AR*(k−1), and the target value newly computed in the present cycle may be expressed in terms of AR*(k).

This routine starts at a step 300, and it is determined wheather the cruising speed SPD*(k) is equal to its previous value SPD*(k−1) and whether the actual travelling speed SPD(k) is equal to the crusing speed SPD*(k). In the case that either of these two equations is not satisfied, the control system has not reached equilibrium state, and therefore, it is determined that finding of intake air quantity, which makes fuel consumption amount minimum, cannot be performed, and the operational flow goes to a step 310. Then processing is performed so as to give intake air quantity AR(SPD), which is given from a preset map using the travelling speed SPD, as the target intake air quantity AR*(k). After this, the processing goes through NEXT to terminate this routine. Namely, turning back to the flowchart of FIG. 7 the target intake air quantity AR*(k) is determined in the step 120 from the map assuming that the controlled object M1 is in transient state.

On the other hand, since the controlled object M1 is regarded as being in equilibrium state when the variables $SPD^*(k)=SPD^*(k-1)$ and $SPD(k)=SPD^*(k)$, then it is possible to search intake air quantity which makes fuel consumption amount minimum. Then the operational flow proceeds to a step 320. In this step 320, it is determined whether a flag Fs is "1" or not. Since the value of the flag Fs is 0 before searching is started, the determination results in "NO" to proceed to step 330. In step 330, the flag Fs is set to "1", regarding that the searching for intake air quantity, with which the travelling speed SPD(k) can be maintained at the cruising speed SPD*(k) with minimum fuel consumption amount, is to be started, and a coefficient D indicative of searching direction, i.e. either direction of increase of intake air quantity or direction of decrease of the same, is set to "1" while a counter Cs indicative of the number of times of processings is set to "0".

In a subsequent step 340, it is checked whether the value of the counter Cs has exceeded 0 or not. Since counter Cs=0 immediately after the start of searching, the oprational flow goes to a step 350 to vary, i.e increase, the target intake air quatity AR*(k) by D×ΔAR from the previous target value AR*(k−1). In a following step 360, the value of the counter Cs is incremented by 1 to terminate the present routine through NEXT.

After such searching has started, when this routine is executed, the determinations in the steps 320 and 340 both result in "YES". Then the operational flow goes to a step 370 to check how the perturbation components δFR(k) in connection with the fuel injection amount FR(k) relative to the steady-state points are changed in comparison with the perturbation components δFR(k−1) of previous cycle.

When the value of δFR(k)−δFR(k−1) is less than a predetermined value −ΔF, it is regarded that the fuel injection amount can be further reduced, and the steps 350 et seq. are executed to continue searching. This indicates a situation in FIG. 5 where approaching from point "b" to point "a".

On the other hand, when the value of δFR(k)−δFR(k−1) is greater than the predetermined vlaue ΔF, it is regarded that the fuel injection amount is increasing, and the value of the searching direction coefficient D is set to "−1" in a step 380 so as to reverse the searching direction. Then the above-mentioned steps 350 and 360 are executed. Therefore, the target intake air quantity AR*(k) is reduced, and the throttle opening degree θ will be reduced. This corresponds to searching in a direction from point "c" to point "a" in FIG. 2.

As the searching in a direction of reducing the fuel injection amount is being performed, then a point, at which the value of δFR(k)−δFR(k−1) is within a given deviation ±ΔF, will be found. This is the point corresponding to intake air quantity with which fuel consumption amount is minimum during cruising. Then, it is regarded that searching is finished, and the flag Fs is set to "0" in a step 390, and in a following step 400 target intake air quantity AR*(k−1) obtained at this time is replaced with a value of a map which determines intake air quantity from the travelling speed SPD, namely, $AR(SPD)=AR^*(k-1)$. In a subsequent step 410, the value of AR*(K−1) is renewed because the previously determined target intake air quantity AR*(k−1) is also used in the present cycle. Then this routine is terminated through NEXT.

One searching process is completed through the above, and then searching is continued from the processing at the beginning and steps 320, 330 and 340.

As described in the above, by repeatedly executing the control routine of FIGS. 7 and 8 the apparatus for controlling vehicle speed according to the present invention not only controls the vehicle speed to the cruising speed but also operates so as to minimize the fuel consumption amount. At this time, the system controlling the controlled object M1 is an integral-added optimal regulator where the feedback gain gives optimal feedback, while the control of the throttle valve opening degree θ and the fuel injection amount FR are realized with quick response and stability which were impossible according to the conventional techniques. Accordingly, the drivability of the vehicle is not deteriorated, and it is now possible to minimize the fuel consumption amount FR by changing the throttle valve opening degree θ.

Furthermore, since the dynamic model varies in accordance with the temperature Thw of the coolant of the internal combustion engine 1, the control is performed by switching the parameters of the observer and the optimal feedback gain depending on the coolant temperature Thw and thus it is possible to provide stable control irrespective of the variation of the temperature Thw of the coolant of the internal combustion engine 1.

It is now possible to perform searching for minimizing the fuel injection amount FR of the internal combustion engine 1 because such superior response and stability have been realized for the first time. This is because although searching is possible by driving the throttle valve by the actuator through conventional feedback control, such structure could not be practically used because of poor response and low stability.

Figure 9:
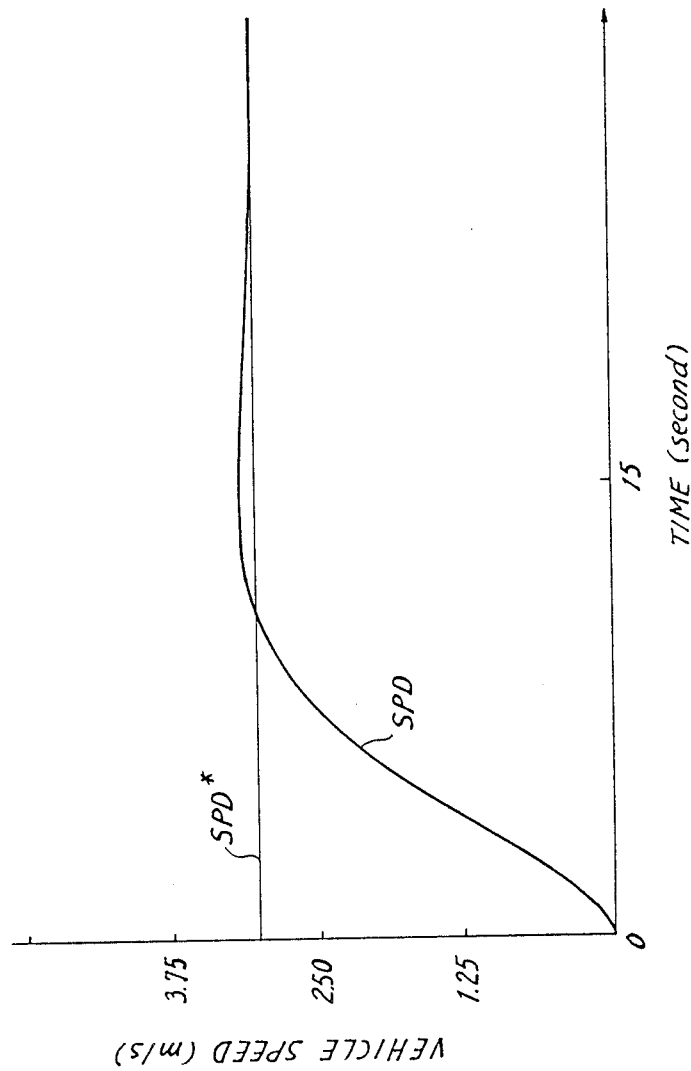
FIG. 9 is a graph showing the characteristic of the embodiment.

FIG. 9 shows the characteristic of the control accoding to the present invention and illustrates the state of the vehicle travelling speed SPD which follows the cruising speed SPD*.

While in the above-mentioned embodiment, the controlled object M1 including the internal combustion engine 1 and the power transmission mechanism is grasped as a system of two inputs and two outputs because the fuel injection amount FR and the throttle valve opening degree $\theta$ are used as the inputs and the intake air quantity AR, and the vehicle travelling speed SPD are used as the outputs, so as to form the integral-added optimal regulator by constructing dynamic model using system identification through least square method, it is also possible to construct dynamic model of a system considering other inputs and outputs in correspondence with a used internal combustion engine and a power transmission mechanism without changing the pith of the present invention.

As described in detail hereinabove, the apparatus for controlling vehicle speed according to the present invention, a target intake air quantity is determined as a value which makes fuel supply amount minimum on the basis of correlation between intake air quantity and fuel supply amount when travelling speed is made constant, and its control means is constructed as an integral-added optimal regulator which determines the amount of feedback on the basis of an optimal feedback gain predetermined according to the dynamic model of the system relating to the operation of a controlled object including an internal combustion engine.

Therefore, while high response and stability, which could not be obtained in the conventional internal combustion engine with a throttle actuator, are realized, the travelling speed of the vehicle is controlled to a crusing speed, and there is a superior advantage that the fuel consumption amount is minimized. Accordingly, the present invention provides superior vehicle driving feeling, while the control characteristic is remarkably improved such that the fuel consumption by a motor vehicle is drastically reduced.

The above-described embodiment is just an example of the present invention, and therefore, it will be apparent for those skilled in the art that many modifications and variations may be made without departing from the scope of the present invention.

What is claimed is:

1. Apparatus for controlling a speed of a vehicle having an internal combustion engine and a power transmission mechanism as a controlled object, comprising:
    (a) intake air flow rate detecting means for producing an intake air flow signal indicative of intake air flow to said internal combustion engine;
    (b) vehicle speed detecting means for producing a vehicle speed signal indicative of a travelling speed of said vehicle;
    (c) cruising speed setting means for setting a constant cruising speed in accordance with said vehicle speed signal when a cruising mode is designated;
    (d) target intake air flow setting means for setting said intake air flow to a value corresponding to a minimum fuel amount capable of maintaining said cruising speed on the basis of a pattern of correlation between fuel amount and intake air flow, predetermined in correspondence with said cruising speed; and
    (e) an integral-added optimal regulator for determining, in receipt of said target intake air flow, said cruising speed, and control input and output values of said controlled object, feedback amounts of controlled variables of said air-fuel mixture supply means on the basis of operating equations used for estimating internal state of said controlled object predetermined in accordance with a dynamic model of the system relating to said controlled object, and also on the basis of an optimal feedback gain, said integral-added optimal regulator then outputting one or more control signals based on said determined feedback amount, said integral-added optimal regulator having:
        (i) a first integrator for integrating a difference between said vehicle speed obtained by said vehicle speed detecting means and a target vehicle speed;
        (ii) a second integrator for integrating the difference between said intake air flow obtained by said intake air flow rate detecting means and the target intake air flow set by said target intake air flow setting means;
        (iii) an observer for estimating an internal state of said internal combustion engine determined on the basis of dynamic models of said internal combustion engine, using information related to throttle valve opening degree, said fuel amount, said vehicle speed and said intake air flow; and
        (iv) feedback amount determining means for determining the rate of air flow and fuel amount fed to said internal combustion engine by computing one of matrix products or vector products of the difference outputs from said first and second integrators, said internal state estimated by said observer, and a predetermined feedback gain, said rate of air flow and fuel amount determined by said feedback amount determining means being fed to said observer;
    (f) air-fuel mixture supply means for supplying air and fuel to said engine in accordance with said rate of air flow and said fuel amount determined by said feedback amount determining means so as to control the speed of said engine, said air-fuel mixture supply means having at least one fuel injection valve and an actuator for adjusting the opening degree of a throttle valve disposed in an intake pipe of said engine so that said rate of air flow and fuel amount are used to control said fuel injection valve and said actuator, respectively.

2. Apparatus as claimed in claim 1, wherein said information related to throttle valve opening degree, said fuel amount, said vehicle speed and said intake air flow are perturbation components of said throttle valve opening degree, said fuel amount, said vehicle speed and said intake air flow.

3. Apparatus as claimed in claim 1, wherein said target intake air flow setting means comprises:
    (a) means for determining whether said travelling speed of said vehicle detected by said vehicle speed detecting means is equal to a predetermined setting speed or not;
    (b) means for setting said intake air flow to a value determined in accordance with said predetermined setting speed when said travelling speed of said vehicle detected by said vehicle speed detecting means is not equal to said predetermined setting speed; and (c) means for incrementing or decrementing said target air flow so that fuel consumption is minimum while cruising speed is maintained using said fuel amount determined by said feedback amount determining means and said intake air flow detected by said intake air flow detecting means when said travelling speed of said vehicle detected by said vehicle speed detecting means is equal to said predetermined setting speed.

* * * * *